Oct. 26, 1937.  T. B. FLANAGAN  2,097,025

SCALE

Filed March 9, 1935　　2 Sheets-Sheet 1

INVENTOR.
Thomas B. Flanagan
BY
W. S. Babcock
ATTORNEY.

Oct. 26, 1937.   T. B. FLANAGAN   2,097,025
SCALE
Filed March 9, 1935   2 Sheets-Sheet 2
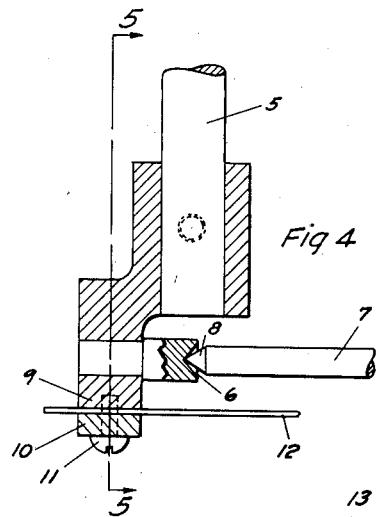
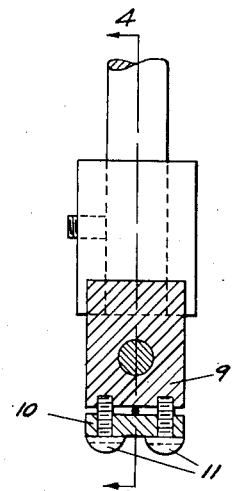
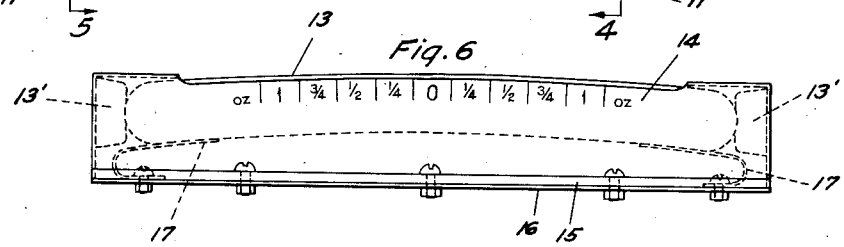
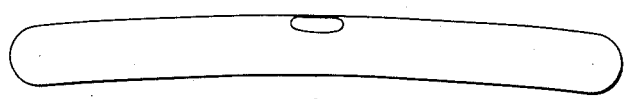
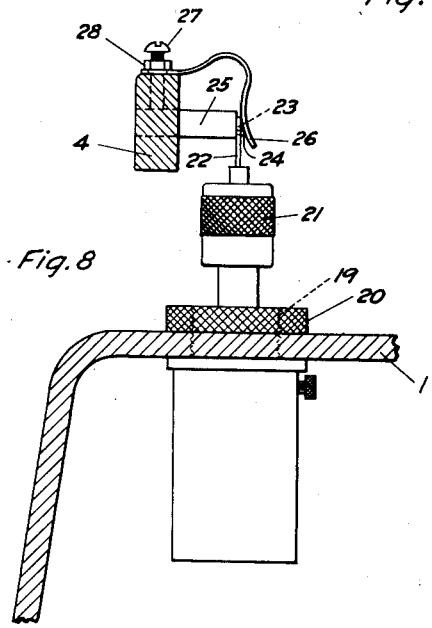
INVENTOR.
Thomas B. Flanagan
BY
H. L. Babcock
ATTORNEY.

Patented Oct. 26, 1937

2,097,025

UNITED STATES PATENT OFFICE 2,097,025

SCALE

Thomas B. Flanagan, Columbus, Ohio

Application March 9, 1935, Serial No. 10,293

14 Claims. (Cl. 265—54)

The invention to be hereinafter described relates to scales.

It is particularly adapted to scales of the under and over weight indicating type, now well known on the market.

One large field for these scales of the under and over weight indicating, or predetermined weight type, is dairy products. In the weighing of pound molds of butter, for instance, many such scales are used. They are set or balanced at the predetermined weight of one pound, or other definite weight, as the case may be. As the predetermined weight is put on its proper platter or pan, the indicator returns toward zero, but indicates the slight excess or insufficiency, as may be the case. One well known scale of this type is disclosed in the U. S. Patent of Walter S. Smith No. 1,405,634, dated Feb. 7, 1922. In this way, articles or packages of approximate predetermined weight may be very rapidly and easily checked as to accuracy and those inaccurate beyond allowable tolerances set aside for correction, or corrected on the scale, as the case may be.

In a moist atmosphere, as around a dairy products company, all parts are subjected to rust and corrosion. This trouble is, of course, greatly increased by salt or similar substances in the atmosphere. So, pivoted parts of the scales used in weighing butter in the dairy products companies are a continual source of trouble. The pivot pins and their sockets after a short time are badly rusted. There is soon so much binding and friction as to render them inoperative for any practical use. This is one of several objections in scales of this class or type, as at present in use. Another serious objection in scales of this type is the multiplied friction and resulting severe binding action at the pivotal connections between the ends of the check rod and the respective outrider stems on the upper ends of which are supported the platters or pans. For instance, if the weight is placed between the center of the platter or pan (which is over the knife-edge mounting of the stem) and the beam fulcrum, it will tend to rock the stem about its knife edge so that the stem will pull on the check rod outwardly from the center, thereby increasing the friction at the pivotal connections between stem and check rod, and between center post and check-rod, respectively. Such binding action is in proportion to the length of the outrider stem and the distance that the weight is off-center, and renders the scale proportionately inaccurate. On the other hand, if the weight is placed outwardly on its respective platter in the opposite direction, or beyond the knife-edge support, there will be a corresponding but opposite result. There will be corresponding increased friction and binding action, but inwardly toward the center.

Frequently, weights are placed more or less off-center this way, with resulting inaccuracy in weighing.

In addition to the above binding or frictional objections, the pin-and-pin-hole connections for the pivots, in practical manufacture, can not be made and kept so accurate and snug-fitting as to completely avoid looseness. Looseness produces a corresponding amount of lost motion. This, in turn, produces corresponding inaccuracy, as well as increased wear.

In order to provide suitable amplification of the index pointer, for the under and over reading, a considerable "tower" structure is required, as is well known. This, of course, makes the scales bulky and space consuming which is an objection in their use and an added cost in their manufacture.

The present invention has been designed to avoid all of the above objections and difficulties, as well as many others, and to provide a scale which may be used indefinitely in moist, salty and other rust producing atmospheres, without being appreciably affected by such atmospheres; a scale which, after setting for a predetermined weight, will promptly return to the zero following every weighing operation; and a scale which is simple, compact, efficient, space saving, durable in all atmospheres in which scales of this type are regularly used; and one which may be produced in quantity at relatively low cost.

While it is obvious that the invention may be applied to a number of other types of scales than that herein illustrated, it is believed that the type selected for illustration, because of its simplicity and familiarity to the public, will more clearly demonstrate the invention. For that reason the invention has been shown in the drawings as applied to a balanced beam, the type in which the beam is fulcrumed on knife-edge bearings at its approximate center, longitudinally, with a pan or platter at each end.

In order to more clearly disclose the construction, operation and use of the invention, reference should be had to the accompanying drawings forming part of this application. Throughout the several figures of the drawings, like reference characters designate the same parts.

In the drawings:—

Fig. 4 is an enlarged fragmentary view through the thrust-bearing mounting at the end of each outrider stem—on line 4—4 of Fig. 5;

Fig. 5 is an enlarged cross section view through one of the wire rod clamps—on line 5—5 of Fig. 4;

Fig. 6 is an enlarged side elevation of the indicator-level, removed, with tube and springs shown in dotted lines;

Fig. 7 is a side elevation of the level tube removed; and,

Fig. 8 is an enlarged cross section detail showing the connection between the beam and dashpot—on line 8—8 of Fig. 1.

Figure 1:
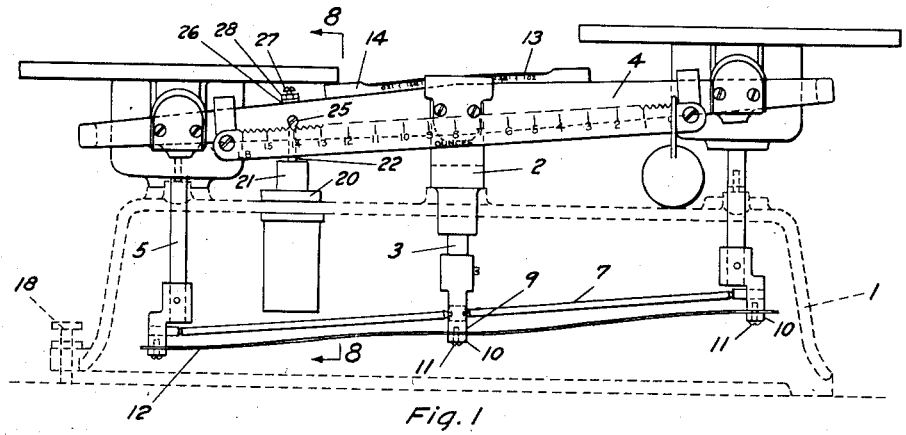
Fig. 1 is a side elevation, unbalanced, with the base and jack-screw shown in dotted lines.
Figure 2:
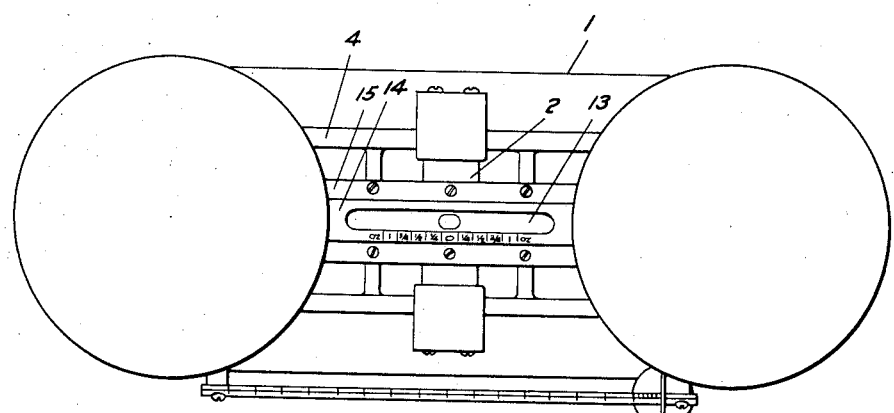
Fig. 2 is a top plan view, balanced.
Figure 3:
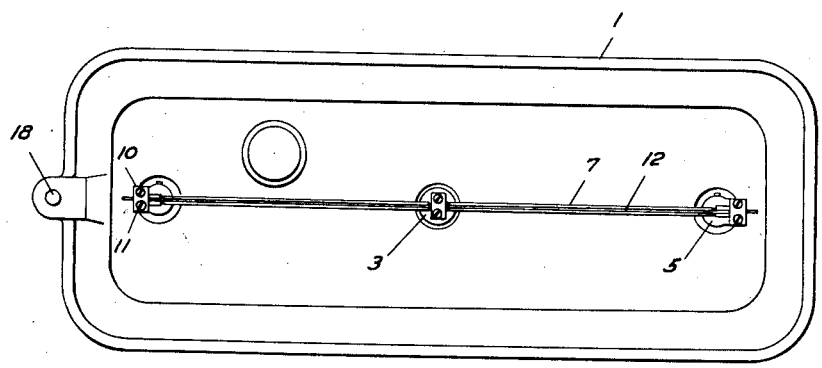
Fig. 3 is a bottom plan view of Fig. 2.

Mounted in the base 1 in usual and well known manner, is a yoke 2, likewise of usual and well known construction. Yoke 2 has a stem or center post 3 extending downwardly within the interior of base 1. Pivotally mounted or fulcrumed in the upper ends of the arms of yoke 2 on the usual knife-edge pivots is a beam 4 carrying, at each end, on knife-edge pivots, an outrider for supporting the usual platter or pan and having an outrider stem 5 projecting downwardly within the base 1. The parts so far mentioned may all be of usual and well known construction, arrangement and assembly, and, therefore, need no further detailed description.

Assume the beam to be balanced and the ends of post 3 and stems 5 to be in the same line, parallel with the beam, but entirely disconnected. Now, depress one end of beam 4. Stem 5 will travel parallelly with center post 3. However, due to the swing about the fulcrum of the beam 4 (in yoke 2) the two stems 5 will move in toward the center post 3. This movement, of course, is very slight only, due to the very short travel of the beam about its fulcrum. Heretofore, the lower ends of the outrider stems 5 were pivotally and positively connected to a one-piece rigid check-rod which was pivoted or fulcrumed and positively connected at its center to the lower end of the center post 3. In that construction, these positive pivotal connections maintained parallellism between the beam 4 and the check-rod. Consequently, as the beam was rocked, the outrider stems 5 were rocked. Beam 4 and the check-rod were maintained parallel and the two outrider stems were maintained parallel. However, in rocking from normally balanced position, the lower end of each outrider stem would rotate slightly about its pivotal connection, all as will be readily understood and as is clearly obvious from the aforementioned Patent 1,405,634.

In the present invention there is no single continuous check rod extending from one outrider stem to the other and no positive pivotal connection between a check rod and an outrider stem. In this invention, the lower part of each outrider stem is provided with a conical end-thrust bearing seat or socket 6. The center post 3 is provided with similar sockets in diametrically opposite faces adapted to be alined with the sockets 6 when beam 4 is balanced. For ease of assembly and adjustment, some or all of said sockets 6 may be formed in short rod sections or bushings seated in the ends of the stems, or in plates or blocks carried on or forming part of a short sleeve secured by a set screw or the like to the lower end of the respective outrider stem or post. Or they may be formed integrally directly on such blocks of supports, or on the ends of the outrider stems, themselves. Preferably, the parts are so assembled that the sockets 6 for the outrider stems will be substantially in the line of the longitudinal axis of the respective outrider stem. Freely revolubly seated in these pairs of sockets are two separate and independent check rods 7 each having its respective ends conically shaped to provide thrust bearings 8 adapted to be freely revolubly seated in sockets 6. Bearings 8 are formed on a considerably greater or sharper angle than the sockets 6 so that when centrally seated therein there is a conical space between each bearing 8 and its respective socket 6. It will be seen that the end-thrust cone bearings 6—8 are at the same points, approximately, as the usual pivotal bearings hereinbefore referred to, and that they provide freely separable mountings, in contradistinction to the positively connected or inseparable pivot connections heretofore in use. So far, there is no structure preventing rods 7 dropping from their places. Each outrider stem 5 and the center post 3 is provided with a relatively wide lower clamping face 9 and has a clamping plate or bar 10 adapted to be tightly clamped thereagainst by suitable clamping screws 11. Faces 9 and plates 10 have a considerable width longitudinally or in the direction from the outrider stem toward the center post 3, for a reason to be later disclosed. A resilient element such as a steel tape, wire or rod 12, of very small diameter, is securely clamped against the faces 9 by the plates 10, through the medium of the screws 11. A single rod has been shown extending the full length from one outrider stem to the other and clamped at the center to the end of the center post 3. It may be disposed above or in the same plane. For best results, it should be so disposed that, in normal or flexed condition, as when the beam is balanced, it would be perpendicular to the center post and outrider stems. In assembling, check rods 7 are properly seated and centered and the elements 12 are then securely clamped in position. This acts to tie the parts together. Element 12 clamped to post 3 and outrider stems 5, maintains rods 7 in their operative positions—they can not drop out. Nevertheless, they have free turning and free end-thrust bearing. And, at the same time, the conical space between each rod end and its cooperating socket provides ample clearance between these parts at all times. There is least possible opportunity for "freezing" or even binding of these parts, by rust.

An essential of element 12 is resilient resistance to distortion, accompanied by power to return to normal, against a limited amount of distorting force. This force is made use of in determining amounts of under and over weight. Such under and over weight is measured by the resilience of the element 12.

As an example in the operation of the scale, assume the beam to be balanced and parallel with its base. Check rods 7 will also be parallel with the base and with the beam. The same is true of element 12 throughout its entire length. It is at rest and not exerting any of its inherent resilient force. The check rods provide rigid end-thrust bearings between the outrider ends and the center post, although not positively connected to them. Element 12 secures these parts in operative position and relation. Now, assume that the beam moves to unbalanced position, in this movement outrider stem 5 will be maintained in parallel, one with the other, but will be moved out of parallel with the center post 3, just as in the case of the positive pivot connection heretofore in use. This position is shown in Fig. 1. Center post 3 is fixed or stationary. Outrider stems 5 are bodily movable with beam 4 and, also, have pivotal movement from their upper ends toward and from each other. Their lower ends have free rocking pivotal movement on the cone surfaces 6—8. So, as beam 4 rocks, the lower end of one outrider will rise above the end of the center post 3 and the lower end of the other stem will be carried below. At the same time, the lower end of the rising outrider stem will rock in a circle about the cone surfaces 6—8, such circle being in a plane intersecting the respective clamp 9—10 and cone-bearing couple 6—8. The lower end of the falling outrider stem will have a similar but reverse movement. During these movements, the clamps 9—10 at the center post 3, being stationary, hold that portion of element 12 parallel with the balanced position of beam 4. This, of course, deflects or bends element 12 against its resilience, upwardly at one side of the center post and downwardly at the opposite side thereof. At the same time, the rocking motion of the outrider stem end deflects or bends element 12v against its resilience upwardly near the rising outrider stem and downwardly near the falling outrider stem. It will be clear that, whenever the beam 4 (and its pans or platters) are balanced (at zero) the element 12 will be idle as to its resilient resistance. Likewise, it will be clear, that whenever the beam is unbalanced the resilient member will be bent against its resilience at four separate points in its length. Its resilience tends to return it to its position of rest or inactivity—the position in which the beam 4 is balanced. Consequently, beam 4 is always urged toward balanced position by the resilient force of the member 12. And, conversely, every unbalancing movement of beam 4 is resisted to a proportionate degree by the resistance of the element 12.

Now, with the above facts in mind, it is a simple matter to provide a scale, of the type mentioned, with a resilient resistance so devised as to off-set or counteract predetermined small units of weight and, in cooperation therewith, means for visually indicating such resistance. Or to put it somewhat differently, with this knowledge, it is possible to determine how far an excess weight of one oz. or any practical fraction thereof, will depress the respective platter against the resilient resistance of the element 12. And, reversely, how far the opposite platter will be correspondingly depressed for a similar shortage of weight. And, of course, by determining the various distances for various "under" and "over" weights, a graduated chart or index may be readily established.

It has been the practice in recent years, to amplify the above scale beam movements by means of a pivoted pointer or needle actuated by connections with the beam, the point of the needle sweeping over the chart or index, in well known manner. This, however, has required a "tower" structure, adding considerably to the space required in use and in shipping, increasing the complexity and cost, and multiplying opportunities for trouble. In the preferred form, this invention proceeds along totally different and far simpler lines and completely eliminates all tower structure, although it is to be clearly understood that the tower type structure may be very easily and practically combined with this invention, in uses and instances where the tower structure is least objectionable. An important feature of this invention is the type and arrangement of indicator. A level tube similar to that used in spirit levels is used. It is of suitable transparent material, or has an upper longitudinal transparent section through which the usual bubble may be observed, as it travels through the liquid. However, this tube is not of the usual and well known straight spirit level type. That would be too quick-acting for practical use in reading an "over" and "under" scale. A very slight tip, and the bubble would rush from one end to the other without stop, before any reading could be taken, and would not come to rest until it had reached the opposite end. The preferred construction is a simple glass tube sufficiently long to cooperate with an adequate set of graduations adjacent one side, and of sufficient diameter to provide free and ready travel for a bubble amply large for observation. This tube, however, instead of being straight or flat is of regular curvature. It is a short arc or segment of the circumference of a large diameter circle. For instance, in a scale of this type in which the distance between the outrider stems is about fourteen inches and the extreme travel of the stem about one inch, a good practical radius could be about fifty inches. This tube 13 may be mounted directly on the beam 4 concentrically with the beam fulcrum and as near to the axis of the fulcrum as is practical. A suitable housing 14 acts as a shield and as a means of securing the tube to the beam. The rounded ends of tube 13 are yieldingly forced into and removable from cupped rubber buffer sockets 13' seated on the inner ends of the housing 14. These sockets hold the tube in place except against forceful removal. Its upper wall is slotted for reading of the bubble and it has a flange 15 around its lower open end. Plate 16 closes the open side. This plate carries leaf springs 17 which engage and hold tube 13 in its upper position within the housing. Plate 16 may be secured in place by small bolts passed through the flange 15 and plate 16 and provided with nuts, as will be obvious. The housing 14 is secured in its place by screws threaded through the flange 15 and into the beam 4. By constructing the level tube as an arc, the ends, when in the same horizontal plane, will both be lower than the center, so that the bubble will rise from either end toward the center. And, by mounting the bubble tube concentrically relatively to the beam fulcrum and with its center on the convex side and above the fulcrum, as in this invention, the bubble will rise to the center or longitudinal middle, as the beam reaches the horizontal or balanced position. In this position, the tube 13 curves downwardly toward both ends. As either end of the beam rises, tube 13 rocks about the beam fulcrum (with the beam) so that the corresponding end of the tube rises and the bubble travels along in the rising tube seeking, always, the higher point. Either the tube 13 or the adjacent wall of the housing 14 is graduated in ozs. and fractions, each graduation corresponding with the equivalent resistance offered in deflecting or distorting the element 12. Because of the curvature of the tube, its rise above the fulcrum is continuous but comparatively slow. For that reason the bubble travels slowly up into it and can not rush. The same, of course, is true in either direction. The speed of travel of the bubble is slowed and made gradual and continuous so that it may cooperate accurately and readily with the graduations of the "under" and "over" chart. The bubble acts as an indicator. Gravity actuates the bubble which is displaced as the heavier liquid seeks the lower level. It is a purely gravity actuated indicator. This construction completely eliminates all "tower" structure and relies entirely upon the beam itself and the level tube on it for a direct amplified reading. The level tube and its parts may be attached and detached as a unit, as will be clear.

The surface on which the scale is used is sometimes somewhat inclined or uneven. To offset this, a jack screw 18 may be used, threaded through an ear or lug of the base, and adapted to engage the supporting surface. By it, the scale base end may be raised or lowered to level it, as desired. A lock nut may be used to secure it in adjusted position. This may, of course, be applied to either or both ends of the base, though its actual use at one end, only, is usually ample, when needed at all.

Dash-pots have long been used to dampen the oscillations of scale beams. Their general structure and operation is well known and need not be detailed here. On the other hand, it has been general practice to assemble and disassemble them from the top side of the scale base, involving considerable unscrewing and unbolting of the parts. The beam, itself, is generally a serious obstacle. In the present invention, these defects and troubles have all been completely eliminated by a construction and arrangement permitting complete removal of the entire dash-pot unit downwardly through the top of the base, from beneath. In this invention, the dash-pot, while itself, being of too great diameter to pass through the opening of the top of the base, is provided with an extension 19 of sufficiently reduced diameter to pass upwardly through the base opening. Extension 19 is threaded. A collar 20 is adapted to be threaded onto this extension above the base and to cooperate with the upper end of the dash-pot to clamp therebetween the top wall of the scale base. The regulating ferrule 21 carried by the sleeve of the stem 22 of the dash-pot piston, and by which the flow in the dash-pot is regulated for increasing or decreasing the dampening effect, is also of a diameter which will pass through the opening in the top of the scale base. Therefore, the entire dash-pot unit, in its completely assembled relation may be easily and quickly removed and replaced from the under side of the top of the scale base, by simply turning off the collar 20 which acts to clamp it to and suspend it from the top of the base. This arrangement is simple, efficient, accurate, positive, and, while reducing difficulties to the minimum, at the same time requires the least possible time and effort.

The piston stem or rod 22 of the dash-pot is, of course, connected to the beam 4. For ease, simplicity and accuracy in making this connection, the upper end of the rod 22 is provided with an eye or small perforation 23 adapted to freely receive a small connecting or coupling pin 24, just as the eye of a needle receives a thread. The pin 24 projects from one end of a small short cylinder or rod 25 which is revolubly and removably seated in a corresponding bore through a side member of the beam 4. This bore is so positioned in the beam, of course, that when the parts are all assembled, the pin 24 will extend through the eye 23. To allow for slight inaccuracies, pin 24 is eccentrically disposed relatively to the axis of its rod 25. So, by rotating rod 25, pin 24 may be moved a very short distance toward or from the beam fulcrum to accommodate corresponding slight variations in the positions of the dash-pot and its stem 22. Cooperating with pin 24 is a small strong leaf spring clip 26. It is secured to the beam 4 by a set screw 27 and lock nut 28. The set screw passes into the beam 4 and is adapted to engage the rod 25 to lock it in any desired adjusted position, as will be readily understood. The lock nut 28 on screw 27 is adapted to be turned down against the clip 26, where screw 27 passes therethrough, to bind it against the beam, and, at the same time, to lock screw 27 against further inward movement. Set screw 27 therefore, acts as a post and support for the spring clip 26, and as a lock for rod 25. Spring clip 26 is so designed and proportioned as to extend beyond and yieldingly, resiliently, engage the free end of pin 24 when the rod 25 is in its extreme inward or operative position. The lower end of the clip is flared or bent outwardly away from the pin so that it may be easily "sprung" away from the pin to permit the end of the stem 22 to be moved up into position for its eye 23 to be threaded onto the pin 24. Then, as soon as the clip is released it snaps back into position against the end of the pin, thereby preventing the stem from slipping off, and holding it in coupled or operative position. This same spring action, as soon as set screw 27 is loosened, pushes rod 25 outwardly, partly through the side of the beam 4, where it may be gripped and rotated to move the pin toward or from the fulcrum. The clip and rod may be easily and quickly removed by simply turning out the set screw 27, as will be clear.

While the connections between the outrider stems and check rods have been so constructed as to minimize any possible rust action, a further protection in that direction is provided in the material used. The resilient member and check rods and all connections and securing means therefore, preferably, are made of very highly rust resistant material or heavily plated with it. The same applies to the dash-pot, its mounting devices. The same applies, also, to the dash-pot connections and adjusting and securing means. The beam, platters, level tube casing, base, outriders, and center yoke, as a matter of economy, need not be made of such, relatively, expensive material. Instead, however, they may be adequately painted or enameled with a coating highly rust resistant. The various knife-edge pivots and cooperating V-blocks, as well as the small cap-plated or shields protecting them, are of hard rust resistant metal. For use in salt, moist air, or other atmosphere specially conducive to rust, those parts may be made of an even greater rust resistant material or more heavily and adequately plated or coated, as to parts better adapted to plating, all as will be readily understood.

The poise weight and its graduated bar are, as usual and are connected and mounted as usual. They operate in well known manner. They are made of or plated with highly rust resistant material. No further description of them seems desirable.

It is understood that only a single simple construction has been illustrated, of the many types and variations to which the invention is thoroughly and readily applicable. Such illustration is purely explanatory and does not in any manner or degree limit the wide range of types of scale to which the invention is thoroughly applicable. And such applications will be thoroughly understood.

It is to be understood that the term member, when used in reference to the wire rod 12 or other corresponding element, is intended broadly and generically and to include all applicable structures and devices capable of accomplishing the same results, and whether in one or more parts, and regardless of relative position in the assembly.

While various details of construction and arrangement have been shown and described in this application, it is to be clearly understood that many changes may be made in the construction, arrangement and disposition of the various parts within the scope of the appended claims, and that the invention may be applied to many other types of scales than herein illustrated, without in any degree departing from the field of the invention, and it is meant to include all such within this application wherein only a single simple application of the invention has been shown in the drawings, purely as an example and with no intention to in any degree limit the application thereby.

Having thus described my invention, what I claim and desire to protect by Letters Patent is:

1. A scale comprising a base having a dashpot opening through its top, a beam pivotally mounted on the top of said base, a complete dashpot unit comprising a well of greater diameter than said opening and provided with a threaded extension of less diameter than said opening, and a threaded clamping collar of greater outer diameter than said opening and adapted to be threaded onto said extension to clamp said dashpot in place on said base, and connections between said dash-pot and said beam.

2. A scale comprising a pivotally mounted beam, an outrider carried thereby, a check rod having freely separable pivotal connections with said outrider end and a single means resisting movement of said beam and maintaining said check rod in operative position.

3. A scale comprising a pivotally mounted beam, an outrider carried thereby, a check rod having freely separable pivotal and revoluble connections with said outrider and a single means resisting movement of said beam and maintaining said check rod in operative position.

4. A scale comprising a pivotally mounted beam, an outrider carried thereby and provided with a conical bearing socket, a check rod provided with a conical bearing on one end adapted to be freely separably revolubly seated in said socket and a single means resisting movement of said beam and maintaining said check rod in operative position.

5. A scale comprising a pivotally mounted beam, a support for said beam, an outrider carried by said beam, a check rod mounted in bearings carried by said outrider and said support, respectively, and a resistance element carried by said outrider and said support and simultaneously exerting resistance to the movement of said beam and maintaining said check rod in operative position.

6. A scale comprising a pivotally mounted beam, a support for said beam, an outrider carried by said beam, bearings carried by the lower ends of said support and said outrider, a check rod freely revolubly removably pivotally suspended in said bearings, and a resilient element connecting said support and said outrider and maintaining said check rod in operative position and simultaneously exerting resistance to the movement of said beam.

7. A scale comprising a pivotally mounted beam, a support for said beam, an outrider carried by said beam, bearings carried by the lower ends of said support and said outrider, a check rod revolubly pivotally suspended in said bearings, a resilient element, and means for removably clamping said element to said support and said outrider to maintain said check rod in operative position and to resist movement of said beam.

8. A scale comprising a pivotally mounted beam, a support for said beam, outriders carried by opposite ends of said beam, a central support for said beam, bearings carried by the lower ends of said support and said outriders, check rods revolubly and removably pivotally suspended in said bearings, a resilient element adapted to resist movement of said beam and means for removably clamping said element to the ends of said outriders and said support to maintain the aforesaid check rods suspended in operative position.

9. A scale comprising a pivotally mounted beam, a dash pot for dampening the movements of said beam, a revoluble member carried in said beam, a pin eccentrically carried on said revoluble member and connections between said pin and said dash pot for adjusting said dash pot by rotation of said member.

10. A scale comprising a pivotally mounted beam, a dash pot for dampening the movements of said beam, a revoluble member carried by said beam and having an eccentrically disposed pin, connections between said pin and said dash pot for adjusting said dash pot by rotation of said member, and a resilient device yieldingly maintaining connections between said pin and said dash pot.

11. A scale comprising a pivotally mounted beam, an outrider carried by each end of said beam, check rods suspended by said outriders, and a single resilient element simultaneously maintaining said check rods in operative position and urging both ends of said beam toward balanced position.

12. A scale comprising a pivotally mounted beam, a support for said beam, an outrider carried by each end of said beam, a check rod freely removably suspended by each outrider and said support, and a single resilient element simultaneously maintaining both said check rods in operative position and urging both ends of said beam toward balanced position.

13. A scale comprising a pivotally mounted beam, a dash pot for dampening the movement of said beam, a revoluble member carried in said beam, a pin eccentrically carried on said revoluble member, connections between said pin and said dash pot for adjusting said dash pot by rotation of said member, and means for locking said revoluble member in selected adjusted position.

14. A scale comprising a pivotally mounted beam, a dash pot for dampening the movements of said beam, a revoluble member carried by said beam and having an eccentrically disposed pin, connections between said pin and said dash pot for adjusting said dash pot by rotation of said member, a resilient device yieldingly maintaining connections between said pin and said dash pot, and means for simultaneously locking said revoluble member in selected adjusted positions and securing said resilient device in operative position.

THOMAS B. FLANAGAN.